United States Patent [19]

Linderfelt

[11] Patent Number: 4,462,211
[45] Date of Patent: Jul. 31, 1984

[54] APPARATUS FOR HARVESTING WAVE ENERGY

[76] Inventor: Hal R. Linderfelt, 5540-A Avenida Soseiga, Laguna Hills, Calif. 92653

[21] Appl. No.: 512,012

[22] Filed: Jul. 8, 1983

[51] Int. Cl.³ .............................................. F03B 13/12
[52] U.S. Cl. ........................................ 60/501; 60/502
[58] Field of Search ................ 60/497, 501, 502, 503; 290/53

[56] References Cited

U.S. PATENT DOCUMENTS

| | | | |
|---|---|---|---|
| 937,712 | 10/1909 | McFarland, Jr. | 60/501 X |
| 3,870,893 | 3/1975 | Mattera | 290/53 |
| 4,208,875 | 6/1980 | Tsubota | 60/502 X |
| 4,359,868 | 11/1982 | Slonim | 60/497 X |

OTHER PUBLICATIONS

"Ocean Wave Energy Conversion", by M. E. McCormick, Wiley-Interscience Publication, John Wiley & Sons, p. 145.

*Primary Examiner*—Allen M. Ostrager
*Attorney, Agent, or Firm*—K. H. Boswell; Edward D. O'Brian

[57] ABSTRACT

A wave energy harvesting apparatus includes a float which rises and falls with wave movements across the surface of a body of water. A hollow tube having a turbine located inside thereof is located vertically downward from the float and is connected to the float by connecting members. The hollow tube is positioned at a depth which is essentially displaced sufficient from the surface of the body of water so as not to be influenced by vertical water movement associated with the waves moving across the surface of the body of water. The tube, however, is moved upwardly and downwardly through the water at that depth in response to movement of the float by the waves on the surface of the water. Movement of the tube upwardly and downwardly at the depth causes rotation of the turbine located in the tube, with the turbine in turn rotating the connecting member to transfer the rotational motion to the surface, wherein this rotational motion is then utilized to drive a generator or the like.

16 Claims, 6 Drawing Figures

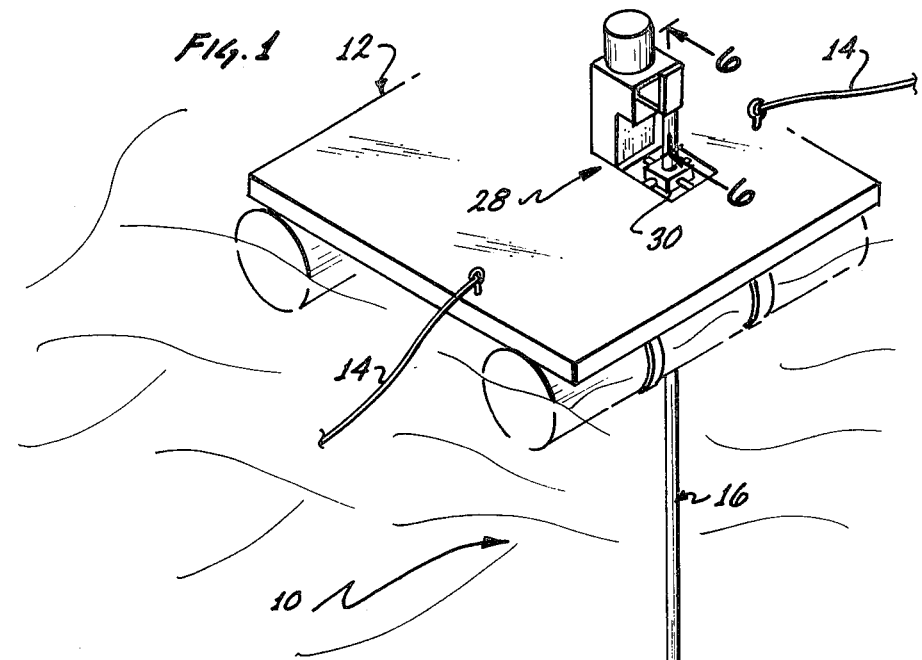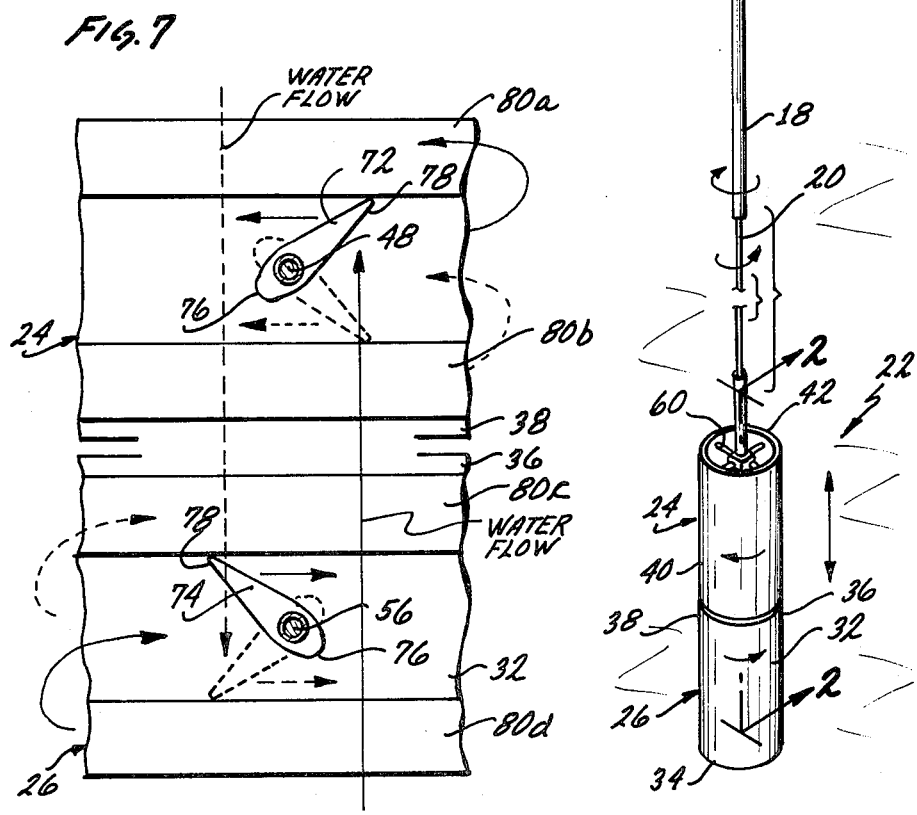

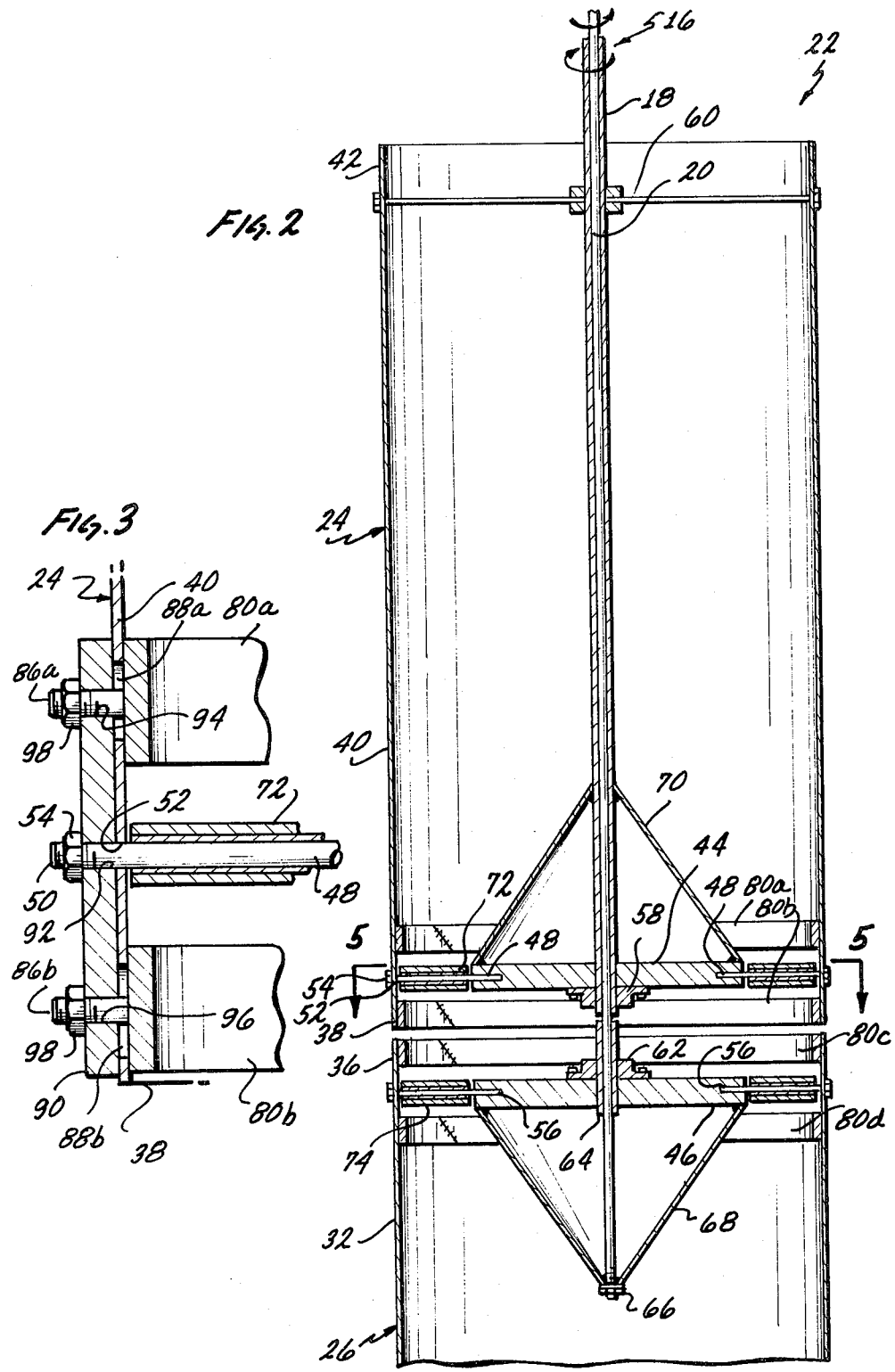

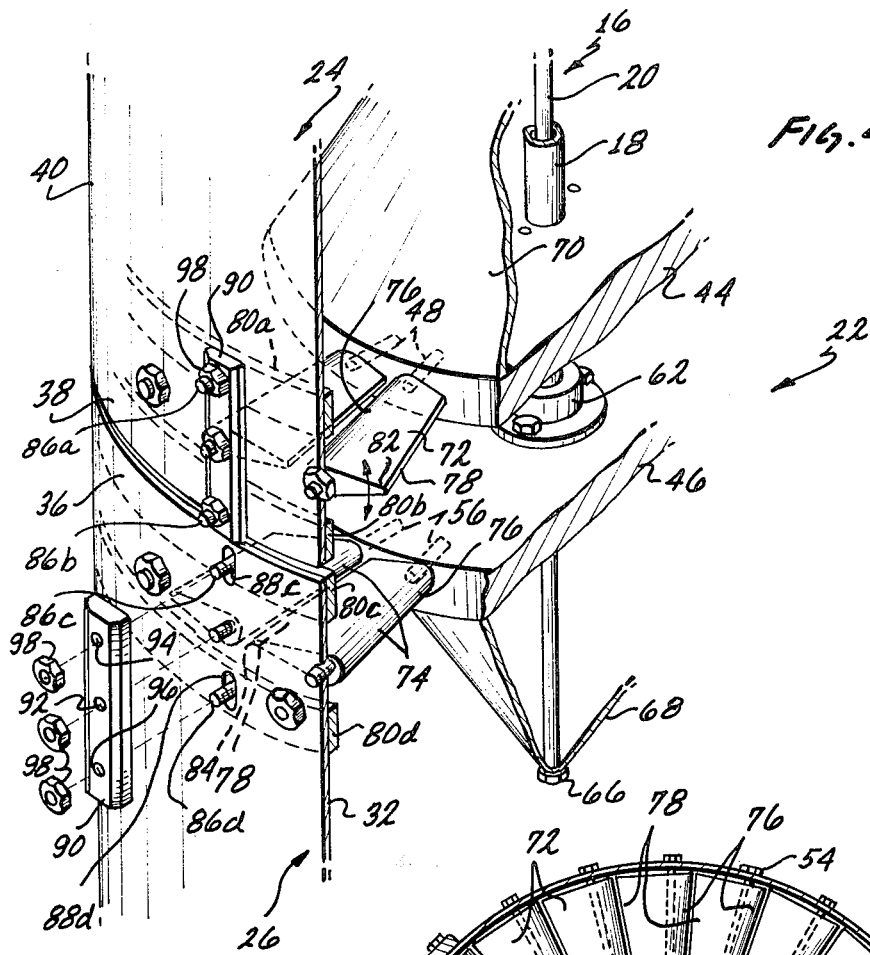
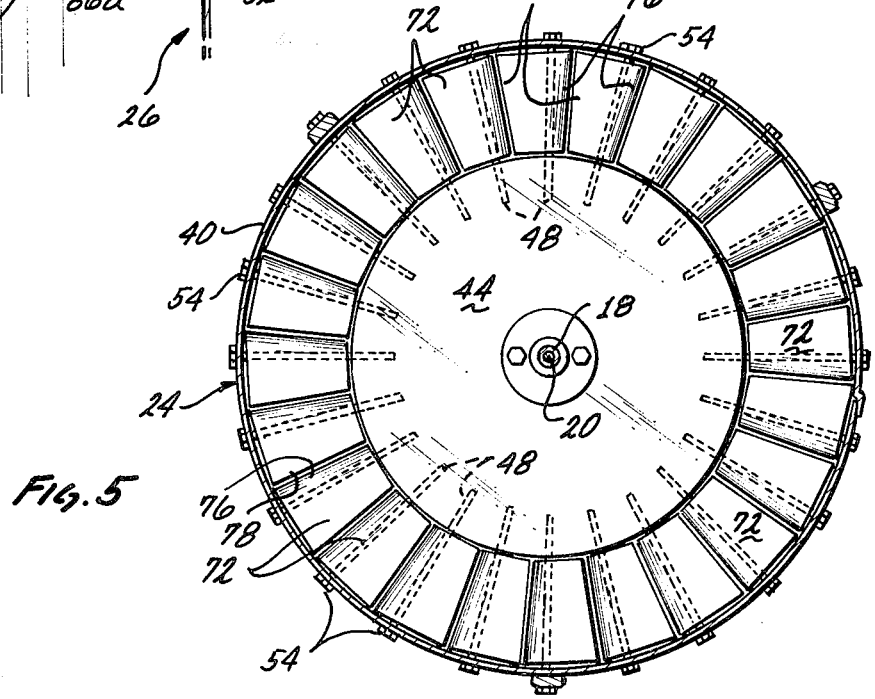

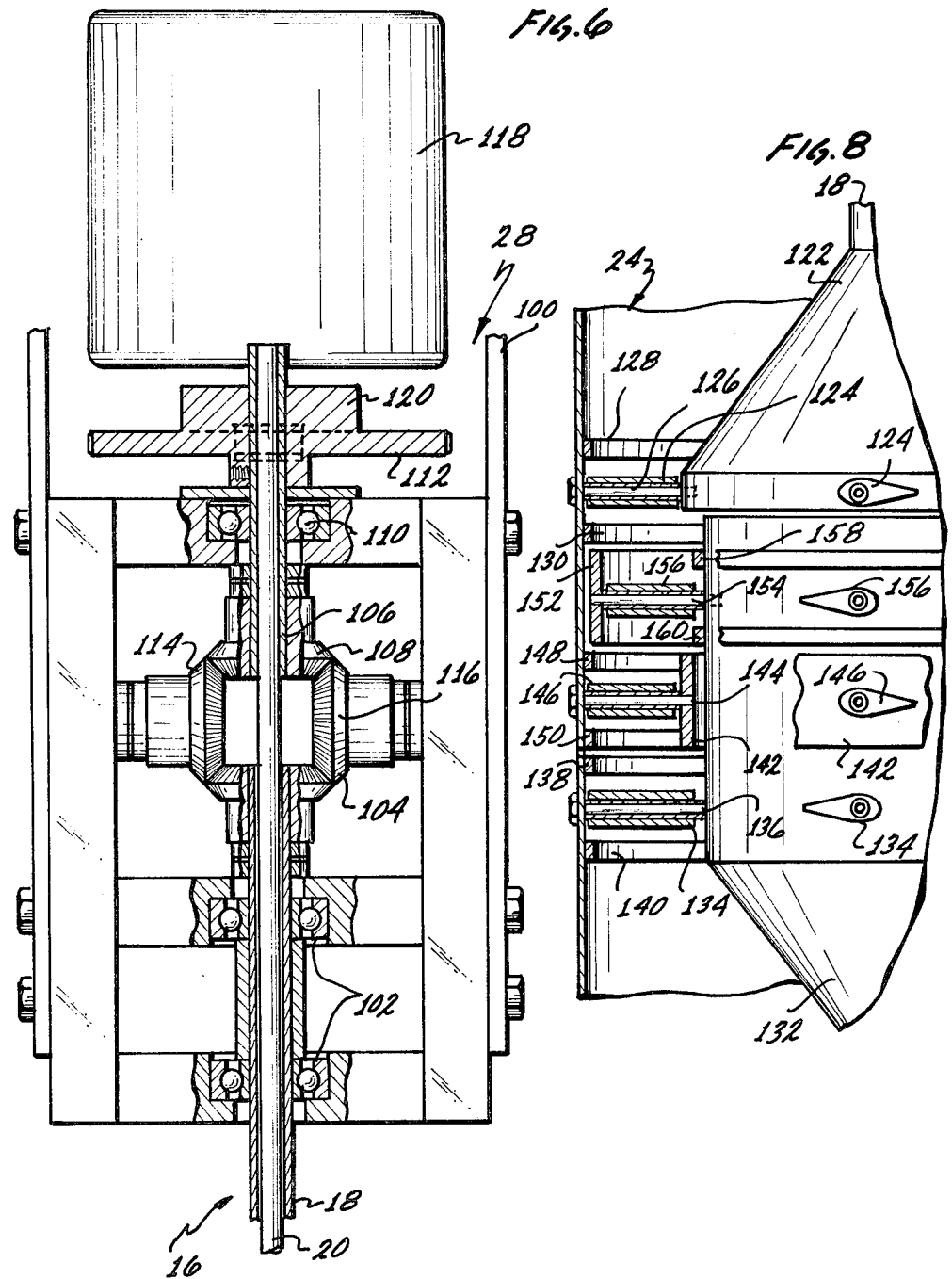

APPARATUS FOR HARVESTING WAVE ENERGY

BACKGROUND OF INVENTION

This invention is directed to an apparatus for harvesting wave energy wherein a float means floating on the surface of the water so as to be acted upon by waves on said surface of said water is connected by a connecting means to a tube means. The tube means included a turbine means located in its interior with the tube means sufficiently displaced by the connecting means below said float means so as to be located at a water depth which is essentially below the depth wherein there is any vertical movement associated with waves on the surface of said water. Upward and downward movement of said float means caused by waves moving across said surface of said water is transferred by said connecting means to said tube means to raise and lower said turbine means in said water at said depth to cause rotation of said turbine means by said raising and lowering of said turbine means. The rotation of said turbine means is then transferred by said connecting means to an energy harvesting means located on said float means.

With the realization that petroleum, coal and other energy resources are of a finite nature, alternate energy sources recently have assumed an important role. Ultimately, all of the energy sources on the earth find their source from the sun.

While a certain amount of the energy received by the earth from the sun can be harvested in the way of biomass and the like. Because the majority of the planet earth is covered by water the majority of the energy reaching the earth from the sun is absorbed by the ocean. As a direct result of the energy absorbed by the ocean large currents within the oceans are generated. Furthermore, energy is transferred from the oceans to the atmosphere to generate weather phenomena within the atmosphere. A portion of the heat energy transferred from the oceans to the atmosphere to form winds is then retransferred back to the oceans in the way of wind formed waves.

Given the large surface area of the earths oceans the amount of energy which the ocean waves possess is phenomenal. Many proposals have been made for harvesting this wave energy. Further, other proposals have been made for harvesting the great amount of energies stored within the current.

For the most part, the proposals set forth for harvesting wave energy have utilized floats and the like which are connected to tethers or other fixed structures attached either to solid land masses or the ocean bottom with the motion of the float with respect to the tether driving some sort of energy harvesting apparatus such as a generator or the like. These apparatuses have sought to harness either the rocking motions of the waves as the individual troughs and peaks of the waves pass a certain point or the vertical up and down movement of the waves as individual troughs and peaks pass a certain point.

With respect to harnessing of the oceans currents proposals have been made to utilize large ducted turbines of dimensions up to hundreds of feet in diameter. These turbines would be vertically oriented in the current with their bottoms tethered to the ocean bottom and their tops to suitable floats, ships or the like.

Notwithstanding, the large potential of energy available in the oceans waves only limited success has been achieved in harvesting this energy. While waves at one time or the other can be found on every point on the surface of the earths oceans, currents generally follow definite patterns. Unfortunately, some of the oceans greatest and most predictable currents, such as the Gulf Stream and the like, are located far out to sea and thus any attempt to harvest the same would require phenomenal problems of transmission of the harvested energy to suitable land-based stations for the distribution of the same. It is known that the vertical movement of waves on the surface of the water extends downwardly for about two and a half times the length of the individual waves. Below this point there is little vertical movement of the water with respect to passage of the waves across it.

BACKGROUND OF THE INVENTION

In view of the above it is an object of this invention to provide an apparatus for harvesting of the wave energy of a body of water which utilizes a moving float located on the surface of the body of the water in conjunction with a turbine located at a depth in the body of water with the turbine converting the movement of the float to transfer the kenetic energy of the waves into other useful forms of energy. It is a further object of this invention to provide an apparatus which would be universally usable within the oceans of the earth at all points wherein water depths slightly exceeded that which was below the depth of influence of vertical water movement of waves on the surface of the water. It is a further object of this invention to provide an apparatus that because of its engineering principles is easily and economicaly constructed and thus results in a long useful lifetime with a rapid payback period.

These and other object as will become evident from the remainder of this specification are achieved in a wave energy harvesting apparatus which comprises: a float means located near the surface of a body of water, said float means rising and falling in response to the passage of waves across said surface of said body of water; a vertically oriented hollow tube means having ends, said tube means located in said body of water below said float means with said ends of said tube means located at a water depth sufficiently below said surface of said body of water so as to be essentially isolated from vertical water movement associated with said waves moving across the surface of said body of water, said water at said depth capable of flowing within said tube means by water movement from the lowermost end of said tube means toward the uppermost end of said tube means and from the uppermost end of said tube means to the lowermost end of said tube means; connecting means extending between said tube means and said float means, said connecting means connecting said tube means to said float means so as said float means rises and falls in response to passage of waves across said surface of said body of water said tube means is raised and lowered in said body of water at said depth to force said water flow within said tube means upwardly from the lowermost of the ends of said tube means to the uppermost end of the ends of said tube means in response to downward movement of said float means and downwardly from the uppermost end of said tube means to the lowermost end of said tube means in response to downward movement of said float means; turbine means operatively associated with and located in said tube means, said turbine means rotated by water flow within said tube means in response to movement of said float means; said connecting means further operatively associated with said turbine means so as to transmit rotational motion of said turbine means to said float means; energy translation means located on said float means in operative association with said connecting means so as to receive rotational motion transferred by said connecting means from said turbine means, said energy translation means translating the kenetic energy of said rotational motion received from said connecting means to a useful alternate form of energy.

Preferredly, the turbine means would include a first and second turbine with these turbines located one above the other and rotating counter to each other. The connecting means would, preferredly, include a first and second connecting member with the first connecting member connecting to the first turbine and the second connecting member connecting to the second turbine. Each of the first and second connecting members would be operatively connected to the energy translation means and would transfer the rotational motion of the first and second turbines to the energy translation means.

Preferredly, the tube means would include a first and second cylindrical member positioned one above the other along a vertical axis with the first turbine located in the first cylindrical member and the second turbine located in the second clindrical member. Preferredly, the first and second turbines are fixedly connected to the first and second cylindrical members respectively such that the first and second cylindrical members rotate in unison with rotation of the first and second turbines. This allows for the first and second cylindrical members to serve as flywheels for the first and second turbines. The presence of the first and second cylinders acting as flywheels evens out the rotational motion of the turbines at those points in the wave wherein the float means ceases vertical movement while crossing over either the peak or the trough of a wave.

Preferredly, each of the turbines would include a plurality of vanes with each of the individual vanes having a leading and a trailing edge. The individual vanes in the fist turbine would be oriented such that the leading edge of all of the vanes points in the same directon and the first turbine always rotates in the direction to which the leading edge of the vanes points. Likewise, the plurality of vanes constituting the second turbine would all be oriented in the same direction with their leading edges pointing opposite to the leading edges of the vanes in the first turbine.

Preferredly, the vanes in both the first and second turbine would each be mounted on a vane support member allowing for pivotal movement of the individual vanes constituting the first and second turbine between a first position and a second position. In the first position the trailing edge of each of the vanes would be located horizontally above the leading edge of the vanes and in the second position the trailing edge be located horizontally below the leading edge of the vanes. In response to water movement upwardly from the lowermost end to the uppermost end of both the first and second cylindrical members each of the vanes constituting the first and second turbine would assume the first position. In response to water moving from the uppermost end to the lowermost end of both the first and second cylindrical members each of the vanes constituting the first and second turbines would assume the second position. By pivotal movement between the first and second positions the vanes in response to both upward and downward movement of the water through the respective first and second cylindrs always drive the first and second turbines and the first and second cylinders attached thereto in a constant direction such that the first turbine and the first cylinder attached thereto always rotate in one of a clockwise or counter-clockwise direction and the second turbine and the second cylinder member attached thereto always rotate in the other of the clockwise or counter-clockwise directions.

A positioning means preferredly is attached to the first and second cylindrical members to position the vanes above the first and second turbines in their respective first and second positions.

A universal connection can be utilized to connect the first and second connecting elements to the float means allowing for maintaining of the first and second connecting elements and the first and second turbines and first and second cylindrical members attached thereto in an essentially constant vertical position while allowing the float means to rock back and forth horizontally in response to wave motion.

Additionally, a throttle means can be positioned within both the first and second cylindrical members in association with the first and second turbines. The throttle means would essentially restrict the cross-sectional area within the first and second cylindrical members at those points wherein the first and second turbines are located so that a higher velocity of water movement through the first and second turbines results.

BRIEF DESCRIPTION OF THE DRAWINGS

This invention will be better understood when taken in conjunction with the drawings wherein:

FIG. 1 is an isometric view of the preferred embodiment of this invention;

FIG. 2 is a side elevational view in section about the line 2—2 of FIG. 1;

FIG. 3 is an enlarged, detailed side elevational view in section of a portion of FIG. 2;

FIG. 4 is an isometric view in partial section showing the center portion of FIG. 2;

FIG. 5 is a top plan view about the line 5—5 of FIG. 2;

FIG. 6 is a side elevational view in partial section about the line 6—6 of FIG. 1;

FIG. 7 is a side elevational view looking from the outside toward the inside of certain components located near the center of FIG. 2 with some of the components shown in FIG. 7 shown first in solid line in the first configuration and in phantom line in a second configuration;

FIG. 8 is a side elevational view in partial section of a further embodiment of the invention.

The invention described in this specification and illustrated in the drawings utilizes certain principles and/or concepts as are set forth in the claims appended hereto. Those skilled in the arts to which this invention pertains will realize that these principles and/or concepts are capable of being utilized in a variety of embodiments differing from the exact embodiment utilized herein for illustrative purposes. For this reason this invention is not to be construed as being limited to the exact illustrative embodiment herein but is only to be construed as being limited by the claims.

DETAILED DESCRIPTION OF THE INVENTION

In FIG. 1 the complete wave harnessing apparatus 10 of the invention is shown. It has several main component parts as follows. The uppermost part constitutes a float 12 designed to float on the surface of a body of water and move up and down in response to wave movement across the surface of the body of water. The float 12 would be appropriately tethered via lines collectively identified by the numeral 14 to anchors (not shown or numbered), platforms (not shown or numbered) or other stable structures fixedly located with respect to a body of water. The slack on the lines 14 would be sufficient to allow the float to move up and down in response to wave passage underneath the same without allowing extensive lateral movement of the float 12 from a position over a fixed location.

Extending downwardly from the bottom of the float 12 is a connecting element 16. Connecting element 16 is, in fact, composed of two concentrically located shafts 18 and 20. Shaft 20 is a central shaft with shaft 18 being a hollow shaft located around the outside surface of shaft 20. Shaft 20 would be free to rotate within the interior of hollow shaft 18.

Attached to the lowermost portion of the connecting element 16 is a combination flywheel-turbine element 22. The flywheel-turbine element 22 has an upper portion 24 and a lower portion 26. In response to wave movement as hereinafter described the upper portion 24 rotates in one direction with the lower portion 26 rotating in the opposite direction.

Rotation of the upper and lower portions 24 and 26 of the flywheel-turbine element 22 is transferred by the connecting element 16 via shafts 18 and 20 to a collecting element 28 located on the upper surface of the float 12. Kenetic energy in the form of rotational motion of the shafts 18 and 20 is translated by the collecting element 28 into some other form of energy suitable for storage or transmission.

Waves moving across the surface of a body of water under the influence of wind cause the surface of the body of water to rise and fall at a certain frequency depending upon the characteristics of the wave. The wave height is dependent upon the overall energy of the wave as is known and need not be discussed here. Generally, while there is some forward motion of water in response to passage of the wave the forward motion of the water is much slower than the forward motion of the wave itself.

As a general rule of thumb the depth of influence for verticle motion associated with a wave is approximately two and a half times the length of the wave. This is, of course, in water which is of a much greater depth than the wave such that the wave is not acutally striking the bottom of the ocean, bay or the like wherein the wave energy harvesting apparatus 10 is appropriately tethered. In any event, at a depth of approximately two and a half times the length of any particular wave the water at or below that depth is essentially still with regard to vertical motion associated with passage of the waves over the surface of the water.

For the wave engery harvesting apparatus 10 the float 12 would, of course, be positioned on the surface of the body of water so as to rise and fall with respect to passages of waves across the surface of the body of the water. The connecting element 16 would be of sufficient length such that the flywheel-turbine element 22 would be positioned at a depth below that which is influenced by the vertical motion of waves passing over the surface of the body of water. The exact depth at which the flywheel-turbine element 22 is positioned would be dependent upon local conditions and the average waves located at these local conditions. The depth would be chosen such that the flywheel-turbine element 22 would be positioned in essentially still water (with respect to vertical movement associated with waves on the surface on the body of water) for most of the time, however, it would not be necessary to position the flywheel-turbine element 22 at such a depth to totally isolate it from vertical water movement associated with large waves which accompany violent storms and the like. In any event, the flywheel-turbine element 22 would be located at a depth such that during normal or average conditions it is positioned at a depth below the depth of influence of the vertical movement of water associated with movement of waves across the surface of the body of the water.

By so positioning the flywheel-turbine element 22 in essentially "still water" and by positioning the float 12 on the surface of the water, the float 12 will rise and fall as waves pass underneath it on the surface of the water and the flywheel-turbine element 22 being connected via the connecting element 16 to the float 12 will first be raised in association with upward movement of the float 12 and then depressed in association with downward movement with the float 12. Since the flywheel-turbine element 22 is located at a depth wherein the water is not moving vertical in association with movement of the float 12 caused by waves at the surface of the water the upward and downward movement of the flywheel-turbine element 22 by the float 12 via the connecting element 16 will push and pull the flywheel-turbine element 22 upwardly and downwardly through the water at that depth to first force water upwardly through the flywheel-turbine element 22 as the float 12 decends and then force water downwardly through the flywheel-turbine element 22 as the float 12 raised up on a crest of a wave.

The action noted in the previous paragraph essentially pumps water first upwardly through the flywheel-turbine element 22 and then downwardly through the flywheel-turbine element 22 in a reciprocal manner. This upwardly and downwardly pumping of water through the flywheel-turbine element 22 interacts with two turbines (hereinafter identified and numbered) located in the interior of the flywheel-turbine element 22 to cause rotation of these two turbines in opposite directions with this rotation then being transferred to the shafts 18 and 20. Rotation of the shafts 18 and 20 is then transferred upwardly to the float 12 to the collecting element 28 wherein the rotational motion ultimately caused by the pumping of water upwardly and downwardly through the flywheel-turbine element 22 is harvested as useful or storable energy.

As waves pass underneath the float 12 the float 12 will rise as the wave builds up and then ride over the crest of the wave and fall as the wave passes underneath it until it reaches the trough of the wave. This can cause a rocking motion of the float 12 depending upon the size of the float 12 with respect to the size of the waves passing underneath. Preferredly, the collecting element 16 would be attached to the collecting element 28 via a universal joint such as gimbel 30. In FIG. 1 gimbel 30 is shown in a representational manner. The exact constructural details of the gimbel 30 would be as is standard in the mechanical arts and for brevity of both the specification and drawings herein exact constructional details of the gimbel 30 are not shown.

Referring now to FIGS. 2 through 5 and FIG. 7 detailed construction of the flywheel-turbine element 22 is shown. Briefly, however, referring to FIG. 1 it can be seen that the upper portion 24 of the flywheel-turbine element 22 is approximately of equal dimenson to the lower portion 26 of the flywheel-turbine element 22. In FIG. 2, of course, because of space limitations of the figure only the upper section of the lower portion 26 of the flywheel-turbine element 22 is shown. The bottom section of the lower portion 26 of the flywheel-turbine element 22 would extend downwardly as is depicted in FIG. 1.

The lower portion 26 of the flywheel-turbine element 22 includes cylindrical member 32 which is hollow and has a lowermost end 34 seen in FIG. 1 and an upper edge 36 shown in FIG. 2. The upper edge 36 is adjacent to a lower edge 38 formed on cylinder 40 which is located directly above and in horizontal alignment with the cylinder 32. The cylinder 40 constitutes the portion of the upper portion 24 of the flywheel-turbine element 22 seen in FIG. 1. The cylinder 40 includes an uppermost end 42. The upper edge 36 of the cylinder 32 and the lower edge 38 of the cylinder 40 are located in close proximity to one another and while not actually joined to one another are spaced in a relationship to one another such that there is little room for water flow between the two. As the flywheel-turbine element 22 is pumped up and down in the water at the depth it is located at, water is forced first into the lower end 34 of the cylinder 32 as the flywheel-turbine element 22 moves downwardly and out of the upper end 42 of the cylinder 40 and then into the upper end 42 of the cylinder 40 and out of the lower end 34 of the cylinder 32 as the flywheel-turbine element 22 moves upwardly. Little or no water leakage of the water which is flowing through the flywheel-turbine element 22 occurs at the joint between the edges 36 and 38.

An upper turbine support member 44 is located in the lower section of the cylinder 40. Likewise, a lower turbine support member 46 is located in the upper section of the cylinder 32. As is best seen in FIGS. 4 and 5 projecting in a radial array from the upper turbine support member 44 are a plurality of vane support rods 48. Each of the vane support rods 48 are threaded at their outermost end 50 and are passed through appropriate holes 52 in the upper cylinder 40 such that they can be attached via nuts 54 which thread on to the ends 50 to secure the rods 48 to the cylinder 40. Likewise, the lower tubine support member 46 includes a plurality of vane support rods 56 which are appropriately mounted to the lower cylinder 32 in a like manner.

The shaft 18 is fixedly attached to the upper turbine support member 44 via a flange 58. The shaft 18 is further attached to the upper cylinder 40 via a spider assembly 60 seen in FIGS. 1 and 2. The spider assembly 60 and the upper vane support member 44 fixedly hold the cylinder 40 concentrically around the shaft 18.

The lower turbine support member 46 is attached via a flange 62 and a bushing 64 to shaft 20. Additionally, the end of shaft 20 is threaded to receive a nut 66 which presses upwardly against inverted cone 68 to fixedly attach the lower cylinder 32 via the lower vane support 46 to the shaft 20. The cone 68 is appropriately positioned against the lower vane support member 46 at its upper end such that the lower cylinder 32 is concentrically held with respect to the shaft 20.

A second cone 70 which is positioned upright fits against the upper surface of the upper vane support member 44 and projects upwardly to the shaft 18 and is welded at its apex to the shaft 18. Aside from structural support, the cones 68 and 70 serve as a throttling mechanism for water passing through the flywheel-turbine element 22 as hereinafter explained.

A plurality of upper turbine vanes collectively identified by the numeral 72 are pivotally mounted about the vane support rods 48. Likewise, a plurality of lower turbine vanes 74 are pivotally mounted about vane support rods 56. Both the vanes 72 and 74 have a leading edge 76 and a trailing edge 78. As is evident from viewing FIGS. 4 and 7, however, the leading edge 76 of the upper turbine vanes 72 is positioned in the opposite direction to the leading edge 76 of the lower turbine vanes 74. All of the vanes 72 and 74 are essentially air-foil shaped in cross-sectioned as is evident from looking at both FIGS. 4 and 7. All of the vanes 72 and 74 are free to rotate within certain limits as hereinafter described on their respective vane support rods 48 and 56.

Positioned rings collectively identified by the numeral 80 are associated with each of the vanes 72 and 74. As is evident from FIGS. 2, 3, 4 and 7 positioning ring 80a is located above the vane 72 with positioning ring 80b located below them. Likewise, positioning ring 80c is located above the vanes 74 with positioning ring 80d located below them. The vanes 72 and 74 are free to pivot on their respective support rods 48 and 56 within limits of travel as seen in FIG. 7 which are governed by interaction of the trailing edges 78 on each of the vane 72 and 74 interacting with the positioning rings 80.

When water flows upwardly through the flywheel-turbine element 22 in response to depression of the flywheel-turbine element 22 as the float 12 moves downwardly, the upward movement of the water through the flywheel-turbine element 22 rotates the vanes 74 and 76 as is seen in solid line in FIG. 7. This positions the trailing edges 78 of the vanes 72 and 74 horizontally above the leading edges 76. The limits of upward travel of the trailing edges 78 is governed by when their outermost radial side edges 82 and 84 respectively of the vanes 72 and 74 contact the upper positioning rings 80a and 80c respectively.

When water moves downwardly through the flywheel-turbine element 22 in response to upward movement of the flywheel-turbine element 22, the vanes 72 and 74 are flipped or rotated about their vane support rods 48 and 56 such that their outside edges 82 and 84 then contact the lower positioning rings 80b and 80d as seen in phantom line in FIG. 7. With each change of water direction through the interior of the flywheel-turbine element 22 the vanes 72 and 74 change their orientation with respect to elevation or depression of their trailing edge 78 with respect to their leading edge 76.

Looking exclusively now at FIG. 7 it can be seen that upward movement of water as depicted by the arrow rotates the vanes 72 and 74 such that their trailing edges 78 are elevated with respect to their leading edges 76. This then positions the vanes 72 and 74 such that in response to the upward water movement through the flywheel-turbine element 22 the vanes 72 are caused to move to the left with the vanes 74 moving to the right as viewed in FIG. 7. This will cause rotation of the upper cylinder 40 in the direction of the solid arrows in FIG. 7 and counter-rotation of the lower cylinder 32 in the direction of the solid arrows in FIG. 7. Now upon downward water flow as is depicted by the phantom arrow in FIG. 7 the vanes 72 and 74 are flipped to the phantom position shown in FIG. 7. The vanes 72 are still moved to the left in FIG. 7 with the vanes 74 still being moved to the right as seen in FIG. 7. This results in the same direction of rotation of the cylinder 40 shown in the phantom line and the same direction of counter-rotation of the cylinder 32 shown in the phantom line. As such, irrespective of the direction of the water flow through the flywheel-turbine element 22, either upwardly or downwardly, the cylinder 40 is caused to rotate in the same constant direction and the cylinder 32 caused to rotate in the same constant counter-direction. Irrespective then of the water flow through the flywheel-turbine element 22 one of the cylinders 32 or 40 always rotate in one direction and the other of the cylinders 32 or 40 always rotate in the other of the directions.

As a consequence of opposite direction of rotation of the cylinders 32 and 40, any torque caused by rotation of these cylinders is not propagated to the float 12 but is cancelled out. The upper portion 24 of the flywheel-turbine element 22 is constructed to have approximately the same mass as the lower portion 26 of the flywheel-turbine element 22 and as such counter-rotation of these two portions 24 and 26 effectively cancels out any torque tending to rotate the float 12 with respect to the flywheel-turbine element 22.

In addition to canceling out torque which would tend to rotate the float 12 on the surface, the rotation of the upper and lower portions 24 and 26 of the flywheel-turbine element 22 produces a gyroscopic effect which tends to keep the flywheel-turbine element 22 and the connecting element 16 in a vertical orientation irrespective of the pitching and twisting of the float 12 in response to wave movement underneath it. As was noted previously, the gimbel 30 allows for maintaining of the connecting element 16 in a vertical orientation irrespective of the orientation of the float 12.

Once the upper and lower portions 24 and 26 of the flywheel-turbine element 22 have started to rotate under the influence of water moving upwardly and downwardly through the flywheel-turbine element 22 the mass of the flywheel-turbine element 22 tends to maintain rotation of the upper and lower portions 24 and 26 of it. While the float 12 is actively going up or down the slope of the wave on either side of the wave the flywheel-turbine element 22 will be moved either upwardly or downwardly in the still water at the depth at which this is located. This, of course, will cause water to impinge upon the vanes 72 and 74 causing rotation of the individual upper and lower portions 24 and 26 of the flywheel-turbine element 22. When the float 12, is either at the peak of the wave or at the trough of the wave its upward or downward motion ceases and for an instance movement of the flywheel-turbine element 22 upwardly or downwardly within the water also ceases. At this instant because water is not passing over them, no momentum is imparted to the vanes 72 and 74. Without the flywheel effect at this time the upper and lower portions 24 and 26 of the flywheel-turbine element 22 would tend to decelerate. However, because the flywheel-turbine element 22 has sufficient mass and because of the flywheel effect imparted thereto once rotation has started at those instances wherein the float traverses across a wave peak or through a wave trough rotation of the upper and lower portions 24 and 26 of the flywheel-turbine element 22 is maintained by the flywheel energy stored in the flywheel-turbine element 22. This evens out the rotational motion imparted to the shafts 18 and 20 maintaining an even positive energy transferral from the flywheel-turbine element 22 to the collecting element 28.

Referring now to FIGS. 3 and 4 the pitch adjustment of the vanes 72 and 74 will be discussed. As noted previously the positioning rings 80a, 80b, 80c and 80d maintain the pitch angle of the vanes 72 and 74 as they flip back and forth in response to reversal of the direction of water movement through the flywheel-turbine element 22.

Each of the positioning rings 80a, 80b, 80c and 80d contain a plurality of bolts 86 thereon which project radially outwardly. The bolts 86 extend through slots 88 formed in the cylinders 32 and 40. The presence of these slots 88 allows for vertical adjustment of the positioning rings 80 within the inside of the cylindrical members 32 and 40. Clamp plates 90 are utilized to position the sets of positioning rings 80 on the cylindrical member 32 and the cylindrical member 40. The clamp plates 90 will be individualized for any particular adjustment of the positioning rings 80. As such, they will include an opening 92 which is fitted over one of the ends of the vane support rods 48 or 56 and further include openings 94 and 96 which are spaced apart at a distance related to the distant desirable between two appropriate positioning rings 80a and 80b, or 80b and 80c. As can be seen in FIG. 5 three of these clamp plates 90 would be space symmetrically about the outside diameter of each of the cylindrical members 32 and 40 to correctly hold the positioning rings 80 located therein in their appropriate orientation. Appropriate nuts collectively identified by the numeral 98 would then be utilized to secure the clamp plates 90 and the positioning rings 80 attached thereto to the cylindrical member 32 and 40.

Referring now to FIG. 6, the coupling of the rotational motion transferred to the collecting element 28 by the shafts 18 and 20 is described. A housing 100 located on the float 12 receives both shafts 18 and 20. In the lower portion of housing 100 shaft 18 is appropriately suspended in bearings collectively identified by the numeral 102. The shaft 18 then is fixedly attached to a bevel gear 104 which is horizontally oriented.

Shaft 20 passes up through shaft 18 and through the bevel gear 104 and fixedly attaches to a sleeve 106. The sleeve 106 is fixed to bevel gear 108 which is horizontally located above bevel gear 104. Furthermore, the sleeve 108 is appropriately mounted in bearings 110 to allow a rotation of the sleeve 106 with respect to the housing 100. Attached to the top of the sleeve 106 is a gear 112 which serves as a power take off or rotational motion transferred by both shafts 18 and 20 as follows.

Left and right bevel gears 114 and 116 respectively engage with both bevel gears 104 and 108. As depicted in FIG. 1 the upper portion 24 of the flywheel-turbine element 22 would rotate clockwise thus rotating the shaft 18 clockwise which in turn would rotate the bevel gear 104 clockwise. Likewise, the lower portion 26 of the flywheel-turbine element 22 would rotate counter-clockwise rotating shaft 20 counter-clockwise and thus bevel gear 108 counter-clockwise. Since bevel gear 104 is rotating clockwise and bevel gear 108 is rotating counter-clockwise when coupled together by bevel gears 114 and 116, the rotation of bevel gears 114 and 116 by bevel gear 104 transfers rotation of the shaft 18 to bevel gear 108. Bevel gear 108 is thus directly rotated by the shaft 20 and indirectly rotated by the shaft 18.

Gear 112 is fixed to the sleeve 106 and thus gear 112 is rotated with respect to rotation of the bevel gear 108. With the rotation of both shafts 18 and 20 transferred to gear 112 through the above noted gear train both the clockwise and counter-clockwise rotation of the separate portions 24 and 26 of the flywheel-turbine element 22 ultimately rotate the gear 112 in a single direction.

An appropriate harvesting apparatus such as a generator or the like can be meshed with gear 112 and thus driven by the same. Thus, for instance a generator 118 can be driven by the gear 112 via interaction of a pinion 120 attaching to the generator 118 meshing with gear 112. Electrical current generated by the generator 118 could be directly used to do some sort of useful work or the same could be stored with appropriate storage batteries and/or linked via electrical lines to a shore facility for transferring of electrical power generated by the generator 118 in response to the movement of the float 12 to such a shore facility.

For simplicities sake the gimbels 30 shown diagrammatically in FIG. 1 could be interspaced on the sleeve 106 between the bearing 110 and the gear 112 such that only a single element, i.e. the sleeve 106, needs to be passed through a universal joint. Alternately, the gimbel 30 could represent a complex gimbel located below the housing 100 and able to transfer both the rotation of shafts 18 and 20.

It is evident that as water flows in either direction through the flywheel-turbine element 22 that within the interior of the flywheel-turbine element 22 the direction of the water is changed as it encounters the upper and lower turbine vanes 72 and 74. As viewed in FIG. 4, water moving upwardly will first encounter the lower turbine vanes 74, and in so encountering them, will transmit energy to them and be deflected clockwise off of them. The water now moving upwardly toward the upper turbine vane 72 strikes these vanes almost at a ninety degree angle, and after imparting energy to these vanes, then moves upwardly prior to being discharged from the upper portion 24 of the flywheel-turbine element 22. Likewise, water moving downwardly through the flywheel-turbine element 22 first strikes the vanes 72 and as viewed in FIG. 4, is given a counterclockwise direction upon leaving the vanes 72 such that it impinges almost normally on the vanes 74 before being discharged out of the lower portion 26 of the fly wheel turbine element 22. Water, in moving through the fly wheel turbine element 22, thus zig zags as it encounters first one set of the vanes and then the other. A portion of the kinetic energy of the water moving through the flywheel turbine element 22 is harvested first by impingement on one of the sets of the vanes 72 or 74 with a second portion of this energy being harvested upon impingement on the other of the vanes 72 or 74. The deflection and the direction of movement of the water after encountering the first of the sets of vanes 72 or 74 increases the efficiency of the contact with the second set of vanes 72 or 74 by coming at the second set of vanes 72 or 74 at an almost perpendicular direction to the vanes 72 or 74. The presence of one set of vanes thus increases the efficiency of the second set of vanes in harvesting the kinetic energy of the water moving through the flywheel-turbine element 22.

In FIG. 8, an alternate embodiment of the invention is shown which incorporates multiple arrays of turbine vanes. In discussing FIG. 8, except for the differences noted between the embodiment of this Fig. and the embodiment of FIGS. 2 through 7, the remainder of the structure is identical as previously described and as such, where features previously described are shown in FIG. 8, the same numeral will be utilized to identify them in FIG. 8 as were used earlier to identify them. For the embodiment of FIG. 8, an upper portion 24 and a lower portion 26 of a flywheel turbine element 22 are also utilized. For FIG. 8, an upper cone 122 attaching to hollow shaft 18 attaches to the upper portion 24 of the flywheel turbine element 22 via a first group of upper turbine vanes 124. The vanes 124 are appropriately mounted on vane support rods 126 with positioning rings 128 and 130 utilized to adjust the angle of attack of the vanes 124 to the water flowing through the flywheel turbine element 22.

Differing from the previous embodiment however, the lower cone 132 extends into the upper portion 24 of the flywheel-turbine element 22. Attaching between the lower cone 132 and the lower portion 26 of the flywheel turbine element 22 is a fourth group of turbine vanes 134. These are supported on vane support rods 136 and their position is adjustable via positioning rings 138 and 140. The first group of turbine vanes 124 and the second group of turbine vanes 134 are located with their leading edges 76 pointed in opposite directions as with the other embodiment.

Differing however from the previous embodiment, the embodiment of FIG. 8 includes a first turbine support ring 142 located within the upper portion 24 of the flywheel-turbine element 22 and coaxial with it. A group of vane support rods 144 extend between the lower portion 24 of the flywheel-turbine element 22 and the support ring 142. A second group of turbine vanes 146 are located about the support rods 144 and are positioning via positioning rings 148 and 150. The second group of turbine vanes 146 are oriented in the same direction as were the first group of turbine rings 124. The first turbine support ring 142 is spaced slightly away from the lower cone 132 such that it is free to rotate in one direction with the lower cone 132 free to rotate in the opposite direction, there being no physical connection between these two members.

A second turbine support ring 152 is also positioned within the interior of the upper portion 24 of the flywheel-turbine element 22 in a coaxial manner with it. It, however, is spaced quite close to the portion 24, but does not actually make any contact with it and thus is free to rotate in an opposite direction from that of the direction of rotation of the upper portion 24. A plurality of vane support rods 154 extend between the second turbine support ring 152 and the lower cone 132. A third group of turbine vanes 156 are located on the support rods 156. Positioning rings 158 and 160 are located on the outside surface of the lower cone 132 and serve to orient the third group of turbine vanes 156 in a manner similar to that explained for the positioning rings for the first embodiment, with the only difference being the positioning rings 158 and 160 being located on the inside radial edge of the vanes 156 instead of on the outside radial edge as previously explained.

The vanes 146 are oriented in the same direction as the vanes 124 and the vanes 156 are oriented in the same direction as the vanes 134. It can be seen that the vanes 146 connect to the upper portion 24 of the flywheel turbine element 22 directly as do the vanes 124, while the vanes 156 indirectly connect to the lower portion 126 of the flywheel turbine element 22 via the lower cone 132, with the vanes 134 directly connecting to the lower portion 26 of the flywheel turbine element 22.

It is obvious that even further groups of vanes could be utilized using further positioning rings such as rings 142 and 152. In any event, water flowing through the embodiment of FIG. 8 passes through the four groups of vanes instead of only two groups of vanes as described in the first embodiment. Each of the groups of vanes 124, 156, 146 and 134 are free to rotate on their respective vane support rings 126, 154, 144 and 136 in a manner as previously described.

For the embodiment of FIG. 8, the angle of attack of the individual groups of vanes can vary. This is accomplished by location of the respective positioning rings 128, 130, 138, 140, 150, 158 and 160 with respect to their respective vanes.

By slowly stepping the angle of attack of the vanes to the water moving either upwardly or downwardly through the embodiment of FIG. 8 in a progressive manner, a more laminar water flow through the embodiment of FIG. 8 is achieved with a greater efficiency of energy transfer between the water and the apparatus.

Thus, as water moves upwardly through the embodiment of FIG. 8, measuring from the vertical axis passing through FIG. 8, the vanes 134 would be located at a small angle of attack, with the vanes 146 at a slightly larger angle of attack, the vanes 156 at even a greater angle of attack and the vanes 124 at the greatest angle of attack.

When water is flowing in the opposite direction, downwardly through the embodiment of FIG. 8, the vanes 124 would be at the smallest angle of attack from the vertical, with the vanes 156 at a slightly greater angle of attack, the vanes 146 at an angle even greater than the vanes 156 and the vanes 134 at the greatest angle of attack.

I claim:

1. A wave energy harvesting apparatus which comprises:

a float means located near the surface of a body of water, said float means rising and falling in response to the passage of waves across said surface of said body of water;

a vertically oriented hollow tube means having ends, said tube means located in said body of water below said float means with said ends of said tube means located at a water depth sufficiently below said surface of said body of water so as to be essentially isolated from vertical water movement associated with said waves moving across the surface of said body of water, said water at said depth capable of flowing within said tube means by both water movement from the lowermost end of said tube means toward the uppermost end of said tube means and from the uppermost end of said tube means to the lowermost end of said tube means;

connecting means extending between said tube means and said float means, said connecting means connecting said tube means to said float means so as said float means rises and falls in response to passage of waves across said surface of said body of water said tube means is raised and lowered in said body of water at said depth to force said water flow within said tube means upwardly from the lowermost of the ends of said tube means to the uppermost end of the ends of said tube means in response to downward movement of said float means and downwardly from the uppermost end of said tube means to the lowermost end of said tube means in response to upward movement of said float means;

turbine means operatively associated with and located in said tube means, said turbine means rotated by water flow within said tube means in response to movement of said float means;

said connecting means further operatively associated with said turbine means so as to transmit rotational motion of said turbine means to said float means;

energy translation means located on said float means in operative association with said connecting means so as to receive rotational motion transferred by said connecting means from said turbine means, said energy translation means translating the kenetic energy of said rotational motion received from said connecting means to a useful alternate form of energy.

2. The apparatus of claim 1 wherein:

said turbine means includes a vane support means operatively connected to said connecting means;

said turbine means further including a plurality of turbine vanes, said plurality of vanes located in an array on said vane support means with each of said vanes individually pivotally mounted on and radially projecting from said vane support means;

each of said vanes in cross-section having a leading edge and a trailing edge, each of said vanes mounted on said vane support means so as to orient said leading edge in a constant direction and in a first position to locate said trailing edge horizontally above the leading edge and in a second position to locate said trailing edge horizontally below said leading edge;

positioning means operatively associated with said plurality of vanes, said positioning means maintaining said plurality of vanes in said first position as water flows through said tube means from said lowermost end to said uppermost end and in a second position as water flows through said tube means from said uppermost end to said lowermost ends whereby said water flowing through said tube means impinges upon said plurality of vanes to rotate said vane support means in said constant direction in response to both water movement from the lowermost end of said tube means toward the uppermost end of said tube means and from the uppermost end of said tube means toward the lowermost end of said tube means.

3. The apparatus of claim 2 wherein:

said vane support means operatively connects between said connecting means and said tube means whereby said tube means rotates in conjunction with rotation of said turbine means.

4. The apparatus of claim 1 wherein:

said turbine means includes a first turbine and a second turbine, said first and said second turbines operatively associated with and located horizontally one above the other in said tube means, said first and said second turbines further each operatively assocaited with said connecting means so as to transfer rotational motion to said connecting means.

5. The apparatus of claim 4 wherein:

said connecting means includes a first connecting element and a second connecting element, said first connecting element operatively connecting between said first turbine and said energy translation means and said second connecting element operatively connecting between said second turbine and said energy translation means.

6. The apparatus of claim 5 wherein:
said first and said second second connecting elements are concentrically located with respect to one another with one of said first and said second connecting elements surrounding the other of said first and said second connecting elements, said first turbine rotating in a clockwise direction in response to water flow through said tube means and in turn rotating said first connecting element in a clockwise direction and said second turbine rotating in a counter-clockwise direction in response to water flow through said tube means and in turn rotating said second connecting element in a counter-clockwise direction.

7. The apparatus of claim 6 wherein:
said tube means includes a first cylindrical member and a second cylindrical member positioned horizontally one above the other;
said first turbine located in said first cylindrical member;
said second turbine located in said second cylindrical member.

8. The apparatus of claim 7 wherein:
said first turbine is fixedly connected between said first cylindrical member and said first connecting element whereby said first turbine, said first cylindrical member and said first connecting element rotate clockwise in unison;
said second turbine is fixedly connected between said second cylindrical member and said second connecting element whereby said second turbine, said second cylindrical member and said second cylindrical element rotate counter-clockwise in unison.

9. The apparatus of claim 8 wherein:
both said first and said second cylindrical members are formed of a dense material whereby said first cylindrical member forms a flywheel rotating in a clockwise direction and said second cylindrical member forms a flywheel rotating in a counter-clockwise direction.

10. The apparatus of claim 9 wherein:
said first turbine includes a first vane support member operatively connected to said first connecting element, said first turbine further including a plurality of first turbine vanes, each of said plurality of first turbine vanes located in an array on said first vane support member with each of said plurality of said first turbine vanes individually pivotally mounted on and radially projecting from said first vane support member;
said second turbine includes a second vane support member operatively connected to said second connecting member, said second turbine further including a plurality of second turbine vanes, said plurality of second turbine vanes located in an array on said second vane support member with each of said plurality of second turbine vanes individually pivotally mounted on and radially projecting from said second vane support member;
each of said first and said second turbine vanes in cross-section having a leading edge and a trailing edge;
each of said plurality of first turbine vanes mounted on said first vane support member so as to orient said leading edge of said first turbine vanes in a constant direction;
each of said plurality of second turbine vanes mounted on said second vane support member so as to orient said leading edge of said second turbine vanes in a constant direction opposite to the constant direction of said first turbine vanes;
both said plurality of first turbine vanes and said plurality of second turbine vanes positionable in a first position to locate said trailing edges horizontally above said leading edges respectively and in a second position to locate said trailing edges horizontally below said leading edges respectively;
positioning means operatively associated with both said plurality of first turbine vanes and said plurality of second turbine vanes, said positioning means maintaining said plurality of said first turbine vanes and said plurality of said second turbine vanes in said first position as water flows through said tube means from said lowermost end to said uppermost end and in said second position as water flows through said tube means from said uppermost end to said lowermost end whereby said water flowing through said tube means impinges upon both said plurality of first turbine vanes and said plurality of said second turbine vanes to rotate said first vane support member in a clockwise direction in response to both water movement from said lowermost end of said tube means towards said uppermost end of said tube means and from said uppermost end of said tube means to said lowermost end of said tube means and to rotate said second vane support member in a counter-clockwise direction in response to both water movement from said lowermost end of said tube means toward said uppermost end of said tube means and from said uppermost end of said tube means towards lowermost end of said tube means.

11. The apparatus of claim 10 including:
universal means operatively attaching said first and said second connecting elements to said float means whereby said first and said second connecting elements and said first and said second cylindrical members attached thereto by said first and said second vane support members are maintained in an essentially vertical orientation irregardless of horizontal pitching of said float means in response to wave movement over said surface of said water.

12. The apparatus of claim 11 including:
water throttling means operatively associated with both said first turbine and said second turbine whereby water flowing through said first and said second cylindrical members is accelerated as said water flows past said plurality of said first turbine vanes and said plurality of said second turbine vanes.

13. The apparatus of claim 12 wherein:
said throttle means comprises a first cone member attaching to the lowermost of said first and said second turbine support members with the apex of said first cone member oriented downwardly and a second cone member attaching to the uppermost of said first and said second cone support members with the apex of said second cone member directed upwardly, the diameter of both said first and said second cone members wherein said first and said second cone members attached to said first and said second turbine support members being less than the diameter of said first and said second cylinder members such that said first and said second plurality of turbine vanes are positioned between the outer periphery of said first and said second cone members respectively and said first and said second cylindrical members respectively.

14. The apparatus of claim 3 wherein:

said tube means includes a first cylindrical member and a second cylindrical member positioned horizontally one above the other;

said turbine means includes a first turbine and a second turbine, said first turbine operatively associated with said first cylindrical member, said second turbine operatively associated with said second cylindrical member;

said connecting means includes a first connecting element and a second connecting element, said first connecting element operatively connecting between said first turbine and said energy translation means and said second connecting element operatively connecting between said second turbine and said energy translation means;

said first and said second connecting elements concentrically located with respect to one another with one of said first and said second connecting elements surrounding the other of said first and said second connecting elements, said first turbine rotating in a clockwise direction in response to water flow through said tube means and in turn rotating said first connecting element in a clockwise direction and said second turbine rotating in a counter-clockwise direction in response to water flow through said tube means and in turn rotating said second connecting element in a counter-clockwise direction;

said first turbine including a plurality of first turbine vanes divided into at least a first and a second vane group, said first vane group horizontally displaced with respect to said second vane group;

said second turbine including a plurality of second turbine vanes divided into at least a third and fourth vane group, said third and said fourth vane group horizontally displaced with respect to one another.

15. The apparatus of claim 14 wherein:

one of said first and said second vane groups is horizontally positioned between said third and said fourth vane group.

16. The apparatus of claim 15 wherein:

each of said members of said first and said second vane groups mounted so as to orient said leading edge of their respective turbine vanes in a constant direction;

each of said members of said third and said fourth vane groups mounted so as to orient said leading edge of the vanes of said respective groups in a constant direction opposite to the constant direction of said first and said second vane groups.

* * * * *

UNITED STATES PATENT AND TRADEMARK OFFICE
CERTIFICATE OF CORRECTION

PATENT NO. : 4,462,211
DATED : JULY 31, 1984
INVENTOR(S) : HAL R. LINDERFELT

It is certified that error appears in the above-identified patent and that said Letters Patent is hereby corrected as shown below:

Column 1, line 9 "included" should read --includes--.

Column 2, line 16 "BACKGROUND" should read --BRIEF DESCRIPTION--.

Column 2, line 34 "object" should read --objects--.

Column 2, line 49 "by water" should read --by both water--.

Column 2, line 65 "downward" should read --upward--.

Column 6, line 64 "collecting" should read --connecting--.

Column 7, line 23 "constitutes the portion of the upper portion" should read --constitutes the upper portion--.

UNITED STATES PATENT AND TRADEMARK OFFICE
CERTIFICATE OF CORRECTION

PATENT NO. : 4,462,211

DATED : JULY 31, 1984

INVENTOR(S) : HAL R. LINDERFELT

It is certified that error appears in the above-identified patent and that said Letters Patent is hereby corrected as shown below:

Column 7, line 48 "are" should read --is--.

Column 8, line 20 "sectioned" should read --section--.

Column 8, line 25 "Positioned" should read --Positioning--.

Column 8, line 28 and 34 "vane" should read --vanes--.

Column 10, line 29 "distant" should read --distance--.

Column 10, line 31, "space" should read --spaced--.

Column 10, line 38 "member" should read --members--.

Column 12, line 5 "numeral" should read --numerals--.

UNITED STATES PATENT AND TRADEMARK OFFICE
CERTIFICATE OF CORRECTION

PATENT NO. : 4,462,211

DATED : JULY 31, 1984

INVENTOR(S) : HAL R. LINDERFELT

Page 3 of 3

It is certified that error appears in the above-identified patent and that said Letters Patent is hereby corrected as shown below:

Column 12, line 36, "positioning" should read --positionable--.

Column 12, line 54 "156" should read --154--.

Column 13, line 10 "rings" should read --rods--.

Column 13, line 15, "140, 150" should read --140, 148, 150--.

Column 14, line 16 "kenetic" should read --kinetic--.

Column 14, line 42 "ends" should read --end--.

Column 14, line 61 "assocaiated" should read --associated--.

Column 15, line 5 "second second" should read --second--.

Column 16, line 67 "attached" should read --attach--.

Signed and Sealed this

Twenty-third Day of April 1985

[SEAL]

Attest:

DONALD J. QUIGG

Attesting Officer

Acting Commissioner of Patents and Trademarks